US010278325B2

(12) United States Patent
Anderson et al.

(10) Patent No.: US 10,278,325 B2
(45) Date of Patent: May 7, 2019

(54) IN-FURROW AGRICULTURAL PRODUCT APPLICATOR

(71) Applicant: CNH Industrial America LLC, New Holland, PA (US)

(72) Inventors: Brian John Anderson, Yorkville, IL (US); Chad M. Johnson, Arlington Heights, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 76 days.

(21) Appl. No.: 15/242,092

(22) Filed: Aug. 19, 2016

(65) Prior Publication Data

US 2018/0049365 A1  Feb. 22, 2018

(51) Int. Cl.
*A01C 5/06* (2006.01)
*A01C 7/20* (2006.01)
*A01C 7/06* (2006.01)

(52) U.S. Cl.
CPC .............. *A01C 5/062* (2013.01); *A01C 5/064* (2013.01); *A01C 7/06* (2013.01); *A01C 7/206* (2013.01)

(58) Field of Classification Search
CPC ........... A01C 5/062; A01C 5/064; A01C 7/06; A01C 7/20; A01C 7/206
See application file for complete search history.

(56) References Cited

U.S. PATENT DOCUMENTS

| 2,888,891 | A |   | 6/1959  | Ackley   |            |
|-----------|---|---|---------|----------|------------|
| 3,453,977 | A |   | 7/1969  | Sorenson |            |
| 3,533,366 | A |   | 10/1970 | Francom  |            |
| 4,446,801 | A | * | 5/1984  | Machnee  | A01C 5/062 |
|           |   |   |         |          | 111/150    |
| 4,669,922 | A | * | 6/1987  | Hooper   | A01C 5/062 |
|           |   |   |         |          | 111/150    |
| 5,025,736 | A |   | 6/1991  | Anderson |            |
| 5,092,255 | A | * | 3/1992  | Long     | A01C 5/068 |
|           |   |   |         |          | 111/167    |

(Continued)

FOREIGN PATENT DOCUMENTS

| AU | 5031298 A    | 7/1999 |
|----|--------------|--------|
| WO | 2010091469 A2 | 8/2010 |

OTHER PUBLICATIONS

Alberta Farm Machinery Research Centre; Evaluation Report 735; Flexi-Coil 1720 Air Cart; Oct. 1998.

(Continued)

*Primary Examiner* — Alicia Torres

(74) *Attorney, Agent, or Firm* — Rebecca L. Henkel; Rickard K. DeMille

(57) ABSTRACT

An agricultural product applicator includes a boot formed from a resilient material. The boot includes at least one bending control support rib that enables the boot to bend about a transverse axis of the applicator. The boot also includes at least one support enables the applicator to bend about the transverse axis and to return to an initial shape after bending. The agricultural product applicator also includes a tube portion extending along a longitudinal axis of the applicator, wherein the tube portion has a first opening that receives an agricultural product supply line and a second opening that deposits agricultural product from the agricultural product supply line into soil.

20 Claims, 4 Drawing Sheets

(56) References Cited

U.S. PATENT DOCUMENTS

| | | | |
|---|---|---|---|
| 5,159,887 A | 11/1992 | Poll | |
| 5,271,343 A | 12/1993 | House | |
| 6,029,591 A | 2/2000 | Baugher et al. | |
| 6,059,047 A * | 5/2000 | Schimke | A01B 35/32 111/200 |
| 6,516,733 B1 * | 2/2003 | Sauder | A01C 7/044 111/180 |
| 6,752,094 B1 | 6/2004 | Truax | |
| 7,357,193 B2 | 4/2008 | Harmon et al. | |
| 7,481,171 B2 | 1/2009 | Martin | |
| 7,856,934 B2 | 12/2010 | Hagny | |
| 9,374,943 B1 * | 6/2016 | Kile | A01C 7/06 |
| 2005/0022706 A1 * | 2/2005 | Johnston | A01C 5/064 111/154 |
| 2009/0013910 A1 * | 1/2009 | Sheppard | A01C 5/062 111/187 |
| 2015/0144042 A1 | 5/2015 | Sheppard et al. | |
| 2015/0334915 A1 * | 11/2015 | Mead | A01C 5/064 111/170 |

OTHER PUBLICATIONS

Cultivating Tools; Do-It-Yourself Retailing 187.2; Aug. 2004.
Farm Clearing Sales.com.au; Private Sales—Seeding and Tillage; Dec. 29, 2015.

* cited by examiner

IN-FURROW AGRICULTURAL PRODUCT APPLICATOR

BACKGROUND

The present disclosure relates generally to improving agricultural product application via an agricultural implement. In particular, the present disclosure relates to using a rubber-molded in-furrow boot capable of flexing to apply fertilizer via the agricultural vehicle and/or implement.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. An agricultural product conveying system (e.g., including a tube portion and a surrounding boot portion configured to mount the agricultural product conveying system to the row unit) is configured to deposit seeds and/or other agricultural products (e.g., fertilizer) into the trench. The opener/agricultural product conveying system is followed by closing discs that move displaced soil back into the trench and/or a packer wheel that packs the soil on top of the deposited seeds.

When applying agricultural product into the trench, the agricultural product conveying system (e.g., including the tube portion and the boot portion) may absorb energy of impacts with rocks, debris, uneven terrain, etc., of a field. Absorbing the energy from these impacts may deform these components, thereby negatively affecting agricultural product placement within the soil.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, an agricultural product applicator includes a boot formed from a resilient material. The boot includes at least one bending control support rib that enables the boot to bend about a transverse axis of the applicator. The boot also includes at least one support that enables the applicator to bend about the transverse axis and to return to an initial shape after bending. The agricultural product applicator also includes a tube portion extending along a longitudinal axis of the applicator, wherein the tube portion has a first opening that receives an agricultural product supply line and a second opening that deposits agricultural product from the agricultural product supply line into soil.

In a second embodiment, a row unit of an agricultural implement includes an agricultural product supply line that transfers agricultural product. The row unit of an agricultural implement also includes an agricultural product applicator. The agricultural product applicator includes a boot formed from a resilient material. The boot includes at least one bending control support rib that enables the boot to bend about a transverse axis of the applicator. The boot also includes at least one support that enables the applicator to bend about the transverse axis and to return to an initial shape after bending. The agricultural product applicator also includes an integrated tube portion extending along a longitudinal axis of the applicator, wherein the tube portion has a first opening that receives the agricultural product supply line and a second opening that deposits the agricultural product from the agricultural product supply line into soil.

In a third embodiment, an agricultural product applicator includes a resilient material shaped in a mold. The agricultural product applicator also includes a tube portion extending along a longitudinal axis of the applicator, wherein the tube portion has a first opening that receives an agricultural product supply line and a second opening that deposits agricultural product from the agricultural product supply line into soil. The agricultural product applicator further includes a boot portion. The boot portion includes at least one bending support rib that enables the boot to bend about a transverse axis of the applicator. The boot portion also includes at least one mounting point that mounts the applicator to an agricultural implement.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure relates generally to improving agricultural product (e.g., fertilizer) application from an agricultural implement (e.g., planter, seeder, fertilizer applicator, etc.). Specifically, the present disclosure relates to using a rubber-molded in-furrow boot capable of flexing during application of the agricultural product. In particular, one embodiment of the present disclosure includes an agricultural product applicator that includes a boot formed from a resilient material. The boot includes at least one bending support rib that enables the boot to bend about a transverse axis of the applicator. The boot also includes at least one support configured to enable the applicator to bend about the transverse axis and to return to an initial shape after bending. The agricultural product applicator also includes a tube portion extending along a longitudinal axis of the applicator, wherein the tube portion has a first opening that receives an agricultural product supply line and a second opening that deposits agricultural product from the agricultural product supply line into soil.

Figure 1:
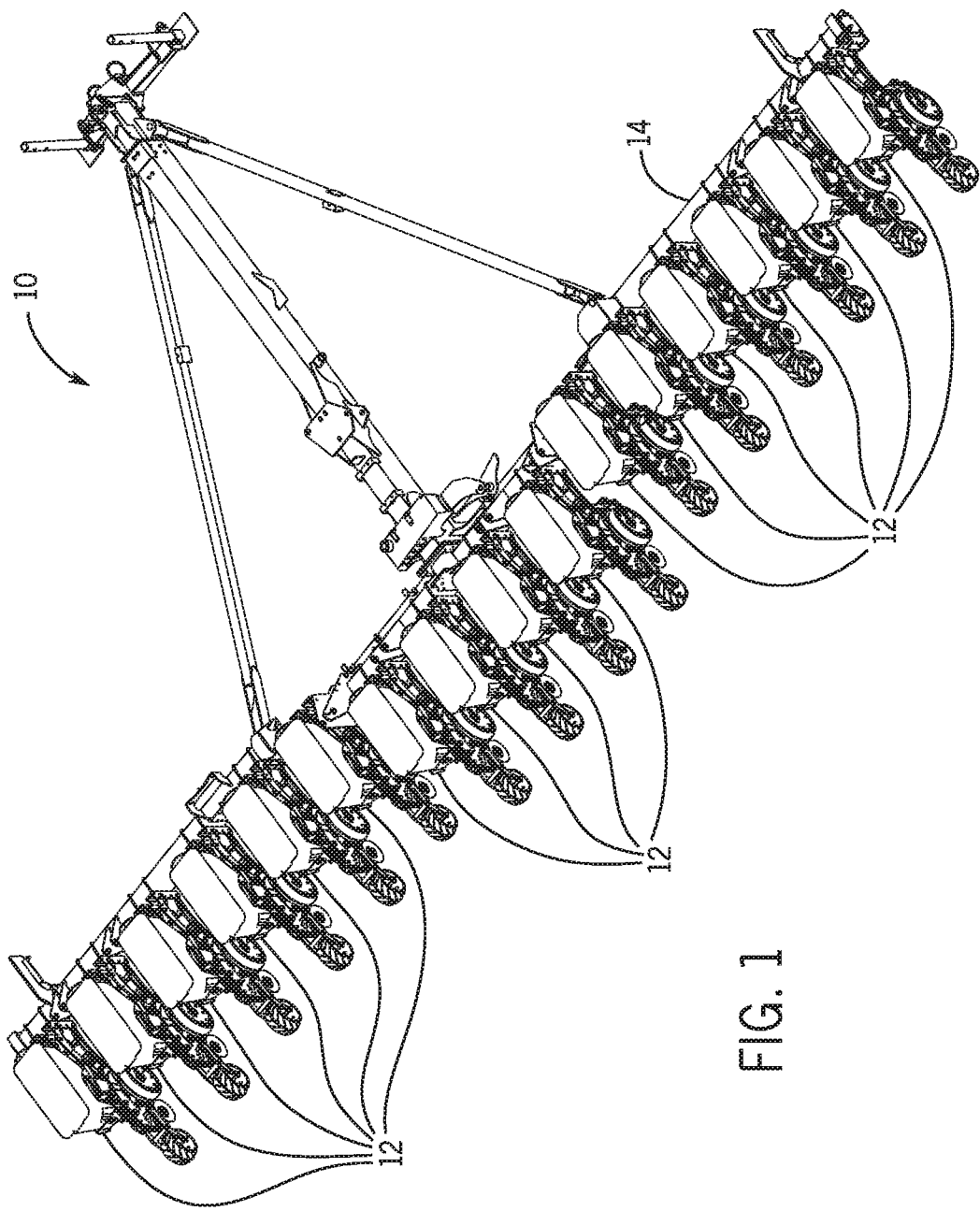
FIG. 1 is a perspective view of an agricultural implement that applies agricultural product to a field, in accordance with an embodiment of the present disclosure.

FIG. 1 is a perspective view of an agricultural implement (e.g., a planter) 10 that applies agricultural product (e.g, fertilizer) to a field, in accordance with an embodiment of the present disclosure. The implement 10 may couple to a work vehicle (e.g., a tractor), which moves the implement 10 through a field to plant seeds and/or apply agricultural product, among other agricultural operations, to the field. In some embodiments, the implement 10 may be self-propelled. The implement 10 includes a toolbar 14 that supports a number of row units 12, which are used to plant the seeds and/or apply the fertilizer. While a planter is illustrated in FIG. 1, it should be understood that the present disclosure may apply to any suitable agricultural implement, including, without limitation, seeders, fertilizer applicators, and the like.

Figure 2:
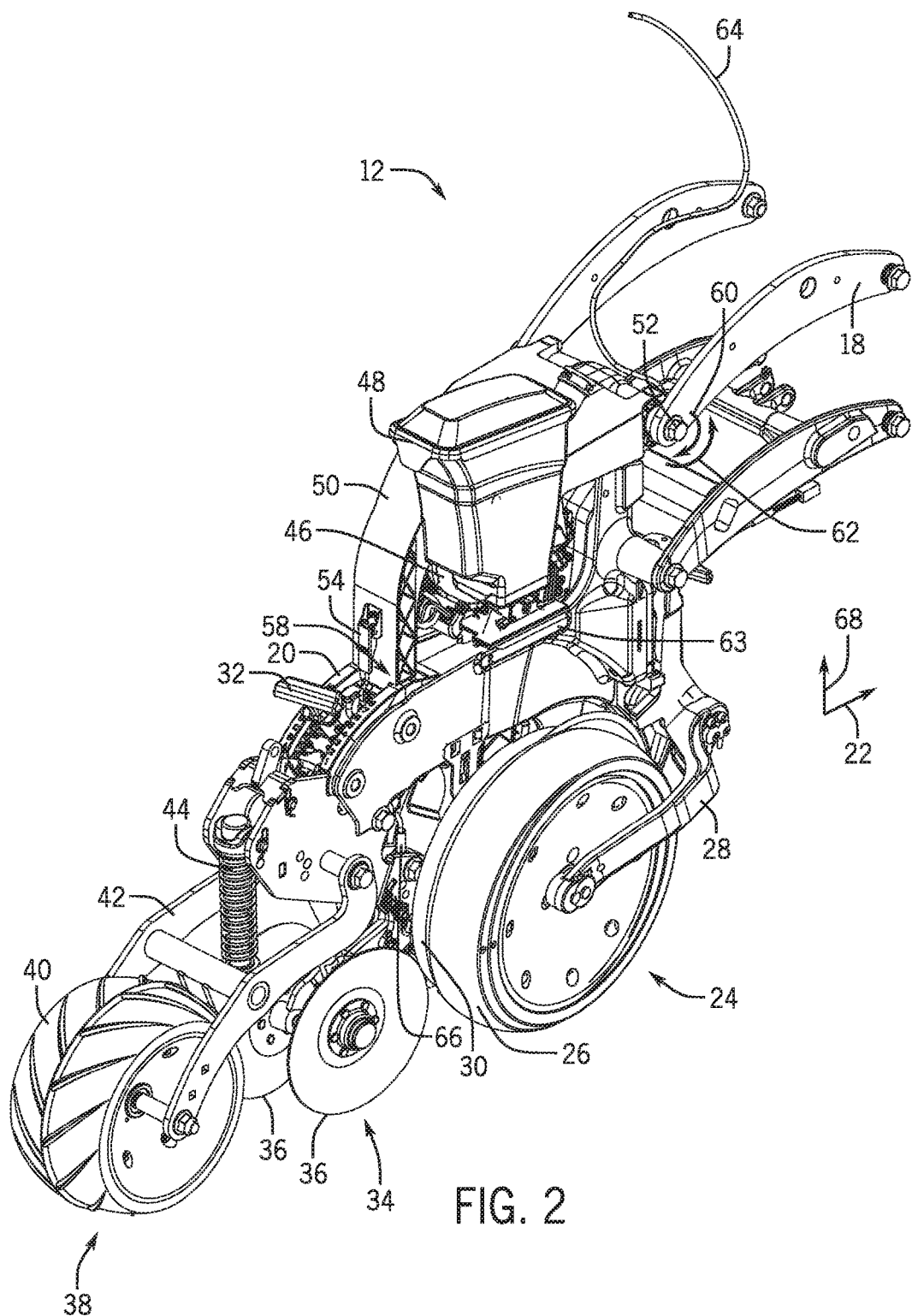
FIG. 2 is a perspective view of a row unit that may be used on the agricultural implement of FIG. 1, in accordance with an embodiment of the present disclosure.

FIG. 2 is a perspective view of a row unit 12 that may be used on the agricultural implement 10 of FIG. 1, in accordance with an embodiment of the present disclosure. The row unit 12 includes a linkage assembly 18 that extends from a frame 20 of the row unit 12. The linkage assembly 18 is configured to enable vertical movement of the frame 20 relative to the toolbar in response to variations in a soil surface. In certain embodiments, a down pressure system (e.g., including a hydraulic actuator, a pneumatic actuator, etc.) may be coupled to the linkage assembly 18 and configured to urge the frame 20 toward the soil surface. While the illustrated linkage assembly 18 is a parallel linkage assembly (e.g., a four-bar linkage assembly), it should be appreciated that in alternative embodiments, another suitable linkage assembly may extend between the bracket and the frame.

The row unit 12 is configured to deposit seeds and/or other agricultural products at a desired depth beneath the soil surface as the row unit 12 traverses a field along a direction 22 of travel. The row unit 12 includes an opener assembly 24 that forms a trench in the soil for seed deposition into the soil. In the illustrated embodiment, the opener assembly 24 includes gauge wheels 26, arms 28 that pivotally couple the gauge wheels 26 to the frame 20, and opener discs 30. The opener discs 30 are configured to excavate a trench into the soil, and the gauge wheels 26 are configured to control a penetration depth of the opener discs 30 into the soil. In the illustrated embodiment, the row unit 12 includes a depth control system 32 configured to control the vertical position of the gauge wheels 26 (e.g., by blocking rotation of the arms 28 in the upward direction beyond a selected orientation), thereby controlling the penetration depth of the opener discs 30 into the soil.

As discussed in detail below, the row unit 12 also includes an agricultural product conveying system (e.g., seed tube or powered agricultural product conveyor) configured to deposit seeds and/or other agricultural products (e.g., fertilizer) into the trench. The opener assembly 24 and the agricultural product conveying system are followed by a closing assembly 34 that moves displaced soil back into the trench. In the illustrated embodiment, the closing assembly 34 includes two closing discs 36. However, it should be appreciated that in alternative embodiments, the closing assembly may include other closing devices (e.g., a single closing disc, etc.). In addition, in certain embodiments, the closing assembly may be omitted. In the illustrated embodiment, the closing assembly 34 is followed by a packing assembly 38 configured to pack soil on top of the deposited seeds and/or other agricultural products. The packing assembly 38 includes a packer wheel 40, an arm 42 that pivotally couples the packer wheel 40 to the frame 20, and a biasing member 44 configured to urge the packer wheel 40 toward the soil surface, thereby enabling the packer wheel 40 to pack soil on top of the deposited seeds and/or other agricultural products. While the illustrated biasing member 44 includes a spring, it should be appreciated that in alternative embodiments, the biasing member may include another suitable biasing device, such as a hydraulic cylinder or a pneumatic cylinder, among others.

The row unit 12 includes a vacuum seed meter 46 configured to receive agricultural product (e.g., seeds) from a hopper 48. In certain embodiments, the vacuum seed meter 46 includes a disc having multiple openings. An air pressure differential between opposite sides of the disc induces the agricultural product (e.g., seeds) to be captured within the openings. As the disc rotates, the agricultural product is conveyed toward the agricultural product conveying system. When the agricultural product (e.g., seed) is aligned with an inlet to the agricultural product conveying system, the air pressure on each side of the disc is substantially equalized (e.g., at the end of a vacuum passage), thereby enabling the agricultural product (e.g., seed) to enter the agricultural product conveying system (e.g., seed tube or powered agricultural product conveyor). The agricultural product conveying system then directs the agricultural product to the trench. While the illustrated embodiment includes a vacuum seed meter, it should be appreciated that in alternative embodiments, other suitable seed/agricultural product meters may be utilized. As used herein, "vacuum" refers to an air pressure that is less than the ambient atmospheric air pressure, and not necessarily 0 pa.

In the illustrated embodiment, the row unit 12 is configured to facilitate installation and removal of the seed meter 46 and the agricultural product conveying system. As illustrated, the row unit 12 includes a seed hopper 50 pivotally coupled to the frame 20 at a joint 52. The seed meter 46 is removably coupled to the seed hopper 50 and configured to rotate with the seed hopper 50 about the joint 52. The row unit 12 also includes a latch 54 configured to secure a distal end 58 of the seed hopper 50, opposite the joint 52, to the frame 20. Accordingly, to remove the seed meter 46, the latch 54 is disengaged, the seed hopper 50 is rotated upwardly about the joint 52 in a first rotational direction 60, and the seed meter 46 is removed from the seed hopper 50. In addition, rotating the seed hopper 50 to the raised position facilitates access to the agricultural product conveying system, thereby facilitating installation and removal of the agricultural product conveying system. Furthermore, with the seed hopper 50 in the raised position after removal of one seed meter, another seed meter may be installed by coupling the seed meter to the arm, rotating the arm downwardly about the joint in a second rotational direction 62, and engaging the latch 54. The seed hopper 50 is configured to substantially align an outlet of the seed meter 46 with the inlet of the agricultural product conveying system, thereby enabling seeds and/or other agricultural products to flow from the seed meter 46 to the agricultural product conveying system. In addition, with the distal end 58 of the seed hopper 50 secured to the frame 20 by the latch 54, movement of the seed meter 46 away from the agricultural product conveying system is blocked. A mount 63 may couple the agricultural product conveying system to the frame 20, which enables seeds and/or other agricultural products to be transferred to the field.

As illustrated, the row unit 12 is coupled to an agricultural product supply line or hose 64 configured to transfer liquid agricultural product (e.g., fertilizer) from a remote reservoir to the row unit 12. The row unit 12 includes an applicator 66 that is coupled to the line 64. The applicator 66 is configured to apply the agricultural product to the field. For example, agricultural product may be transferred via the line 64 to the boot applicator 66 for distribution within the field. The applicator 66 may be oriented such that a direction 68 parallel to a longitudinal axis of the applicator 66 is transverse to the direction 22 of travel. As illustrated, the applicator 66 may be disposed between the closing assembly 34 and the agricultural product conveying system (as coupled to the mount 63) and/or the opener assembly 24.

Figure 3:
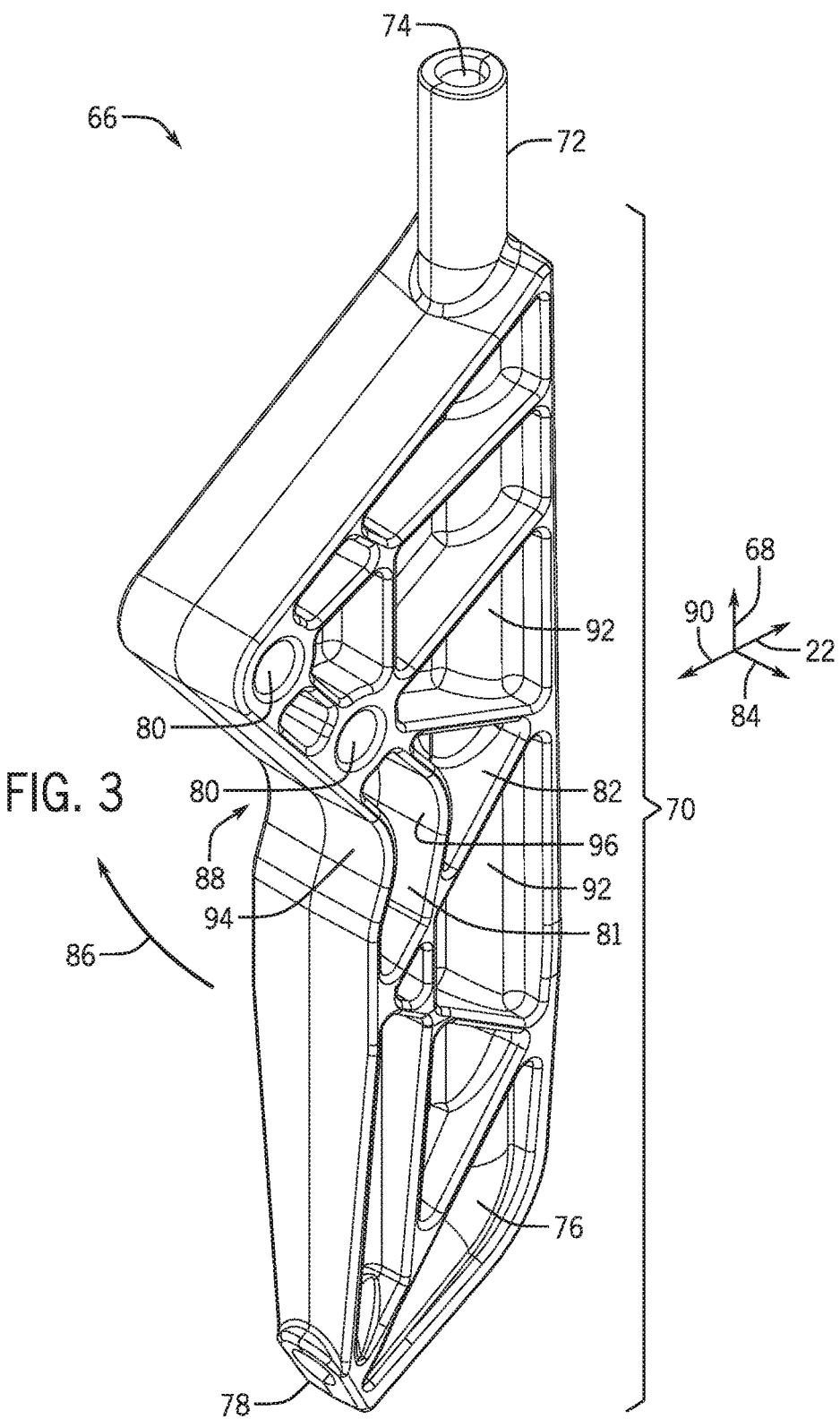
FIG. 3 is a perspective view of an applicator that may be used on the row unit of FIG. 2, in accordance with an embodiment of the present disclosure.

FIG. 3 is a perspective view of an applicator 66 that may be used on the row unit 12 of FIG. 2, in accordance with an embodiment of the present disclosure. The applicator 66 may include a boot portion 70 and a tube portion 72. The boot 70 and/or tube may be formed from a flexible material that is resistant to weather, water, heat, etc., such as a rubber-based material. In some embodiments, the rubber-based material may include a synthetic rubber, such as a viscoelastic polymer. For example, the rubber-based material may include an elastomer, such as ethylene propylene diene monomer rubber. In some embodiments, the tube 72 may be formed from nylon or other materials with the boot 70 molded around the tube 72. In other embodiments, the boot 70 and the tube 72 may be integrally molded from a single material. The flexible material may enable the boot 70 and/or tube 72 to flex and tend to return to its original shape when flexed. As will be appreciated, the hardness of the boot 70 and/or tube 72 may be characterized by the resistance to indentation, otherwise referred to as Durometer, denoted in the Shore A scale, for example. Within the Durometer scale, materials are generally characterized based on ranges. Hard elastomers generally include those having a Durometer greater than about 80 Shore A, soft elastomers generally include those having a Durometer of about 60 Shore A to about 80 Shore A, and super-soft elastomers generally include those having a Durometer below about 60 Shore A. In certain embodiments, the boot 70 and/or tube 72 may be composed of a material having a Durometer of approximately between 70 to 100 Shore A. For example, the boot 70 and/or tube 72 may be composed of a material having a Durometer of approximately 80 Shore A, 85 Shore A, 90 Shore A, and the like.

The tube 72 extends along a longitudinal axis of the applicator 66 that is transverse to the direction 22 that the row unit 12/agricultural implement travels. As illustrated, the tube 72 extends past the boot 70 in the direction 68. In alternative embodiments, the tube 72 may not extend past the boot 70. The tube 72 enables liquid agricultural product (e.g., fertilizer) to be conveyed to the trench formed by the opener assembly 24. The tube 72 includes a first opening 74 that is configured to couple to the line 64 and receive the agricultural product from the line 64. The tube 72 also includes a bend 76 that directs the agricultural product to a desired position within the trench. As such, the bend 76 may be at an angle of less than 90 degrees in relation to a longitudinal axis of the applicator 66 that is transverse to the direction 22 of travel. The tube 72 includes a second opening 78 that is configured to deposit the agricultural product to the trench. As illustrated, the second opening 78 is configured to apply the agricultural product in a direction 90 opposite of the direction 22 that the row unit 12/agricultural implement travels. In some embodiments, the second opening 78 may be larger than the first opening 74 (e.g., the second opening 78 may have a larger diameter than the first opening 74) to enable the agricultural product to exit the tube 72 at a lower velocity, thus reducing disturbance of seeds in the trench. The boot 70 includes mounting points 80 that enable mounting the applicator 66 to the row unit 12. While the illustrated embodiment shows two mounting points 80, it should be understood that the boot 70 may include fewer or more than two mounting points to mount the applicator 66 to a frame 20 of the row unit 12.

In the illustrated embodiment, the boot 70 includes two bending control support ribs 94, 96 that enable the boot 70 to predictably bend in a direction 86 about a transverse axis 84 of the boot 70, such that buckling of the boot 70 may be avoided. As such, the boot 70 may flex in a predictable planar direction, rather than bending off to one side, which could push the boot 70 into a sidewall of the trench, for example. Each bending control support rib 94, 96 is concave in a direction 90 opposite of the direction 22 that the row unit 12/agricultural implement travels, to facilitate bending of the boot 70. While the illustrated embodiment shows two bending control support ribs 94, 96, it should be understood that the boot 70 may include fewer or more than two bending control support ribs to that enable the boot 70 to bend.

The boot 70 also includes a number of supports 92 that contribute to maintaining the initial shape of the boot 70 and returning the boot 70 to the initial shape after flexing or pivoting. As such, when the row unit 12 travels over rocks, debris, uneven terrain, etc., and absorbs energy from impacts, the boot 70 may flex and pivot, and return to the initial shape after the row unit 12 passes the rocks, debris, uneven terrain, etc. The supports 92 may be of any suitable number to maintain the initial shape of the boot. The supports 92 may also be of any suitable thickness (e.g., on the order of millimeters, such as 1 mm, 2 mm, and the like) to maintain the initial shape of the boot. Recessed areas between the supports 92 may also be of any suitable arrangement (e.g., taking the shape of triangles, quadrilaterals, hexagons, and the like).

Figure 4:
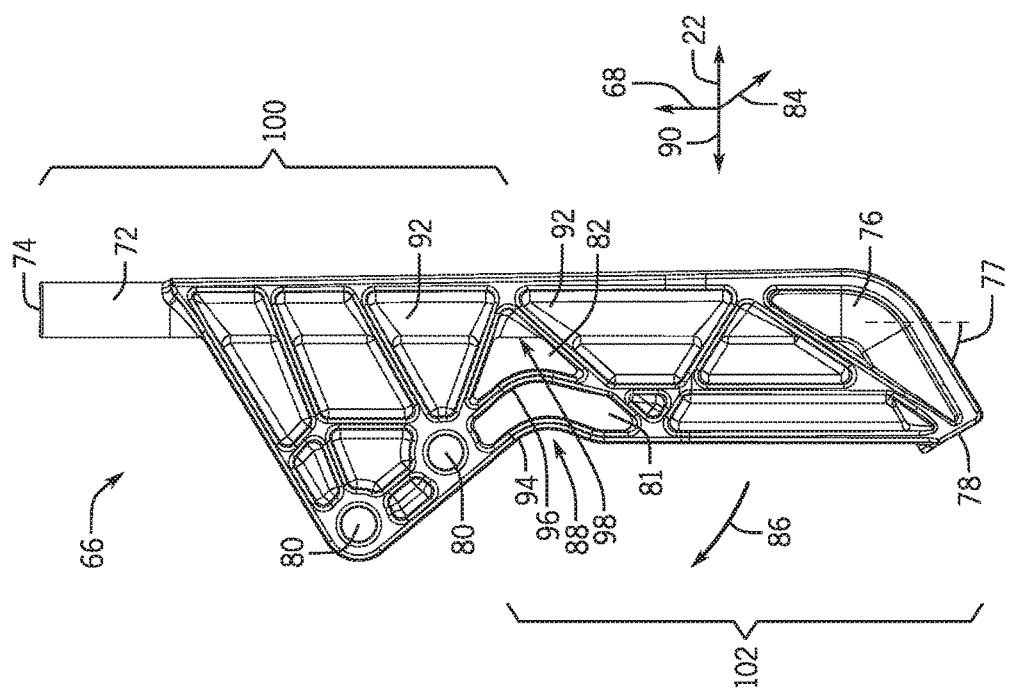
FIG. 4 is a side view of the applicator of FIG. 3, in accordance with an embodiment of the present disclosure.

FIG. 4 is a side view of the applicator 66 of FIG. 3, in accordance with an embodiment of the present disclosure. As illustrated, the boot 70 includes two bending control support ribs 94, 96 that enable the boot 70 to predictably bend in a direction 86 about a transverse axis 84 of the boot 70, such that buckling of the boot 70 may be avoided. As such, the boot 70 may flex in a predictable planar direction, rather than bending off to one side, which could push the boot 70 into a sidewall of the trench, for example. Each bending control support rib 94, 96 is concave in a direction 90 opposite of the direction 22 that the row unit 12/agricultural implement travels, to facilitate bending of the boot 70. A first opening 81 includes five sides, including the two bending control support ribs 94, 96. A second opening 82 includes three sides, including the bending control support rib 96. The openings 81, 82 extend through the boot 70 along the transverse axis 84. As illustrated, a portion 98 of the second opening 82 does not extend through the boot 70 because of a presence of the tube 72. In some embodiments, portions of the openings 81, 82 may not extend completely through the boot 70. In other embodiments, the openings 81, 82 may extend completely through the boot 70. As the row unit 12 travels over rocks, debris, uneven terrain, etc., the applicator 66 may bend such that a top portion 100 of the applicator 66 remains in approximately the same position in relation to the frame 20 of the row unit 12, while a bottom portion 102 of the applicator 66 bends upwardly and rearwardly in the direction 86 about the transverse axis 84. Due to the material of the boot 70 and/or the tube 72, the openings 81, 82, and the configuration of the supports 92, the applicator 66 may return to the initial shape after the row unit 12 travels over rocks, debris, uneven terrain, etc. As mentioned above, the bend 76 may be at an angle 77 of less than 90 degrees in relation to a longitudinal axis of the applicator 66 that is transverse to the direction 22 of travel.

Figure 5:
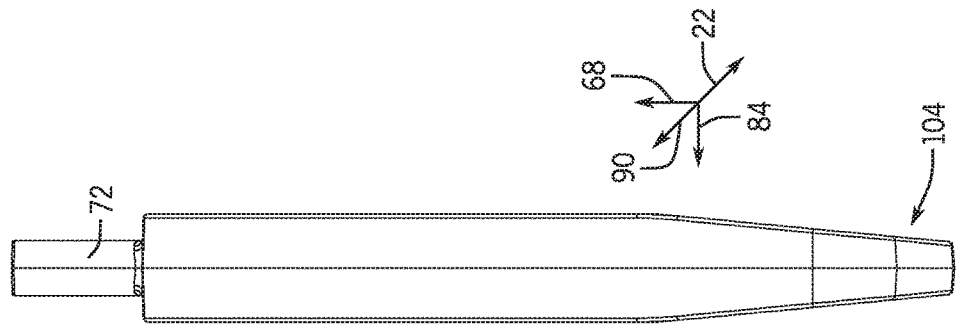
FIG. 5 is a front view of the applicator of FIG. 3, in accordance with an embodiment of the present disclosure.

FIG. 5 is a front view of the applicator 66 of FIG. 3, in accordance with an embodiment of the present disclosure. As illustrated, the applicator 66 includes a tapered end 104, such that the applicator 66 is tapered in a direction 68 parallel to a longitudinal axis of the applicator 66 that is transverse to the direction 22 of travel. The tapered end 104 is disposed at an end closest to the soil on which the agricultural product is applied by the applicator 66. The tapered end 104 may enable the applicator 66 to enter and travel within the trench formed by the opener assembly 24 with reduced resistance and/or friction, such that the row unit 12/agricultural implement 10 may apply agricultural product more efficiently.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural product applicator, comprising:
a boot formed from a rubber-based material, wherein the boot comprises:
a plurality of bending control support ribs that enable the boot to bend in a planar direction about a transverse axis of the applicator and prevent the boot from bending toward a side of the planar direction; and
at least one support that enables the applicator to bend about the transverse axis and to return to an initial shape after bending; and
a tube portion extending along a longitudinal axis of the applicator, wherein the tube portion has a first opening configured to receive an agricultural product supply line and a second opening configured to deposit agricultural product from the agricultural product supply line into soil.

2. The agricultural product applicator of claim 1, wherein the second opening is larger than the first opening.

3. The agricultural product applicator of claim 1, wherein the tube portion comprises a bend configured to direct the agricultural product to a desired position into the soil.

4. The agricultural product applicator of claim 3, wherein the bend is at an angle of less than 90 degrees in relation to a longitudinal axis of the agricultural product applicator.

5. The agricultural product applicator of claim 1, wherein the rubber-based material comprises synthetic rubber.

6. A row unit of an agricultural implement, comprising:
an agricultural product supply line configured to transfer agricultural product; and
an agricultural product applicator, comprising:
a boot formed from a rubber-based material, wherein the boot comprises:
a top portion;
a bottom portion;
at least one bending control support rib disposed between the top portion and the bottom portion that urges the bottom portion to bend toward the top portion about a transverse axis of the applicator; and
a plurality of supports that enable the applicator to bend about the transverse axis and to return to an initial shape after bending, wherein the plurality of supports are separated by one or more recessed areas of the boot; and
an integrated tube portion extending along a longitudinal axis of the applicator, wherein the integrated tube portion has a first opening configured to receive the agricultural product supply line and a second opening configured to deposit the agricultural product from the agricultural product supply line into soil.

7. The row unit of claim 6, wherein the integrated tube portion has a bend configured to direct the agricultural product from the agricultural product supply line in a first direction opposite of a second direction that the agricultural implement travels.

8. The row unit of claim 6, wherein the at least one bending control support rib comprises a concave side that is concave in a first direction opposite of a second direction that the agricultural implement travels.

9. The row unit of claim 8, wherein the concave side facilitates bending of the boot in a third direction about the transverse axis of the applicator.

10. The row unit of claim 6, wherein the boot is formed from an elastomer.

11. The row unit of claim 6, wherein the boot is formed from ethylene propylene diene monomer rubber.

12. An agricultural product applicator, comprising:
a tube portion extending along a longitudinal axis of the applicator, wherein the tube portion has a first opening configured to receive an agricultural product supply line and a second opening configured to deposit agricultural product from the agricultural product supply line into soil; and
a boot portion formed from a rubber-based material, wherein the boot portion comprises:
a top portion;
a bottom portion;
a plurality of bending control support ribs disposed between the top portion and the bottom portion, wherein the plurality of bending control support ribs urge the bottom portion to bend toward the top portion in a planar direction about a transverse axis of the applicator and prevent the bottom portion from bending toward a side of the planar direction; and at least one mounting point configured to mount the applicator to an agricultural implement.

13. The agricultural product applicator of claim 12, wherein the boot portion comprises a plurality of supports that enable the applicator to bend about the transverse axis and to return to an initial shape after bending, wherein the plurality of supports are separated by one or more recessed areas of the boot.

14. The agricultural product applicator of claim 12, wherein the plurality of bending control support ribs comprise at least one bending support rib that includes comprises a concave side that is concave in a first direction opposite of a second direction that the agricultural implement travels.

15. The agricultural product applicator of claim 14, wherein the concave side facilitates bending of the boot in a third direction about a transverse axis of the boot.

16. The agricultural product applicator of claim 13, wherein the second opening is larger in diameter than the first opening.

17. The agricultural product applicator of claim 1, wherein the plurality of bending control support ribs comprise at least a first bending control support rib and a second bending control support rib.

18. The agricultural product applicator of claim 17, wherein the second bending control support rib is disposed at an exterior surface of the boot.

19. The agricultural product applicator of claim 17, wherein the first bending control support rib is configured to enable the boot to bend about the transverse axis of the applicator in a first direction, and wherein the second bending control support rib is disposed adjacent to the first bending control support rib in a second direction opposite of the first direction.

20. The agricultural product applicator of claim 17, wherein the first bending control support rib is disposed at an interior of a body of the boot.

* * * * *